United States Patent Office 2,819,797
Patented Jan. 14, 1958

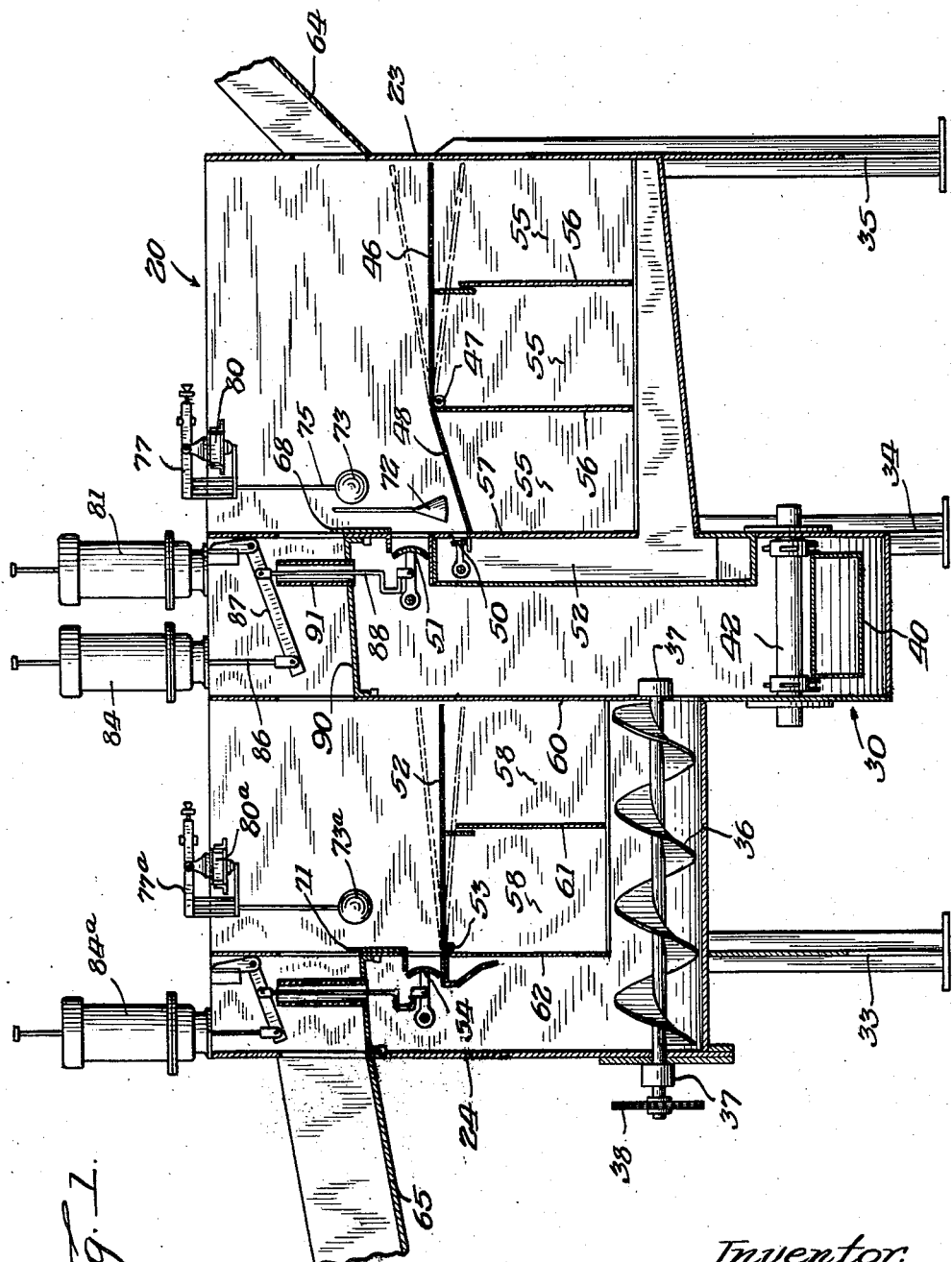

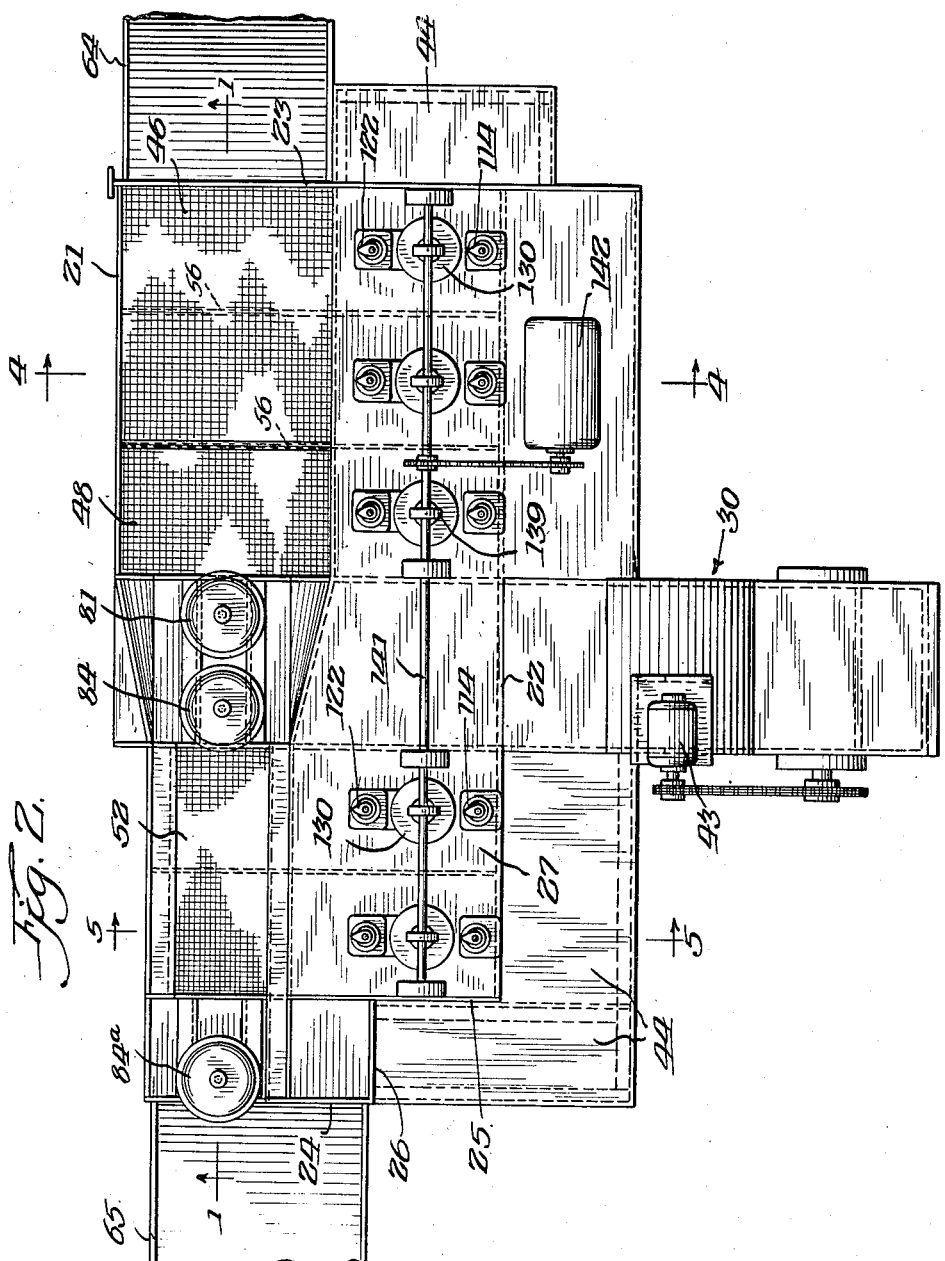

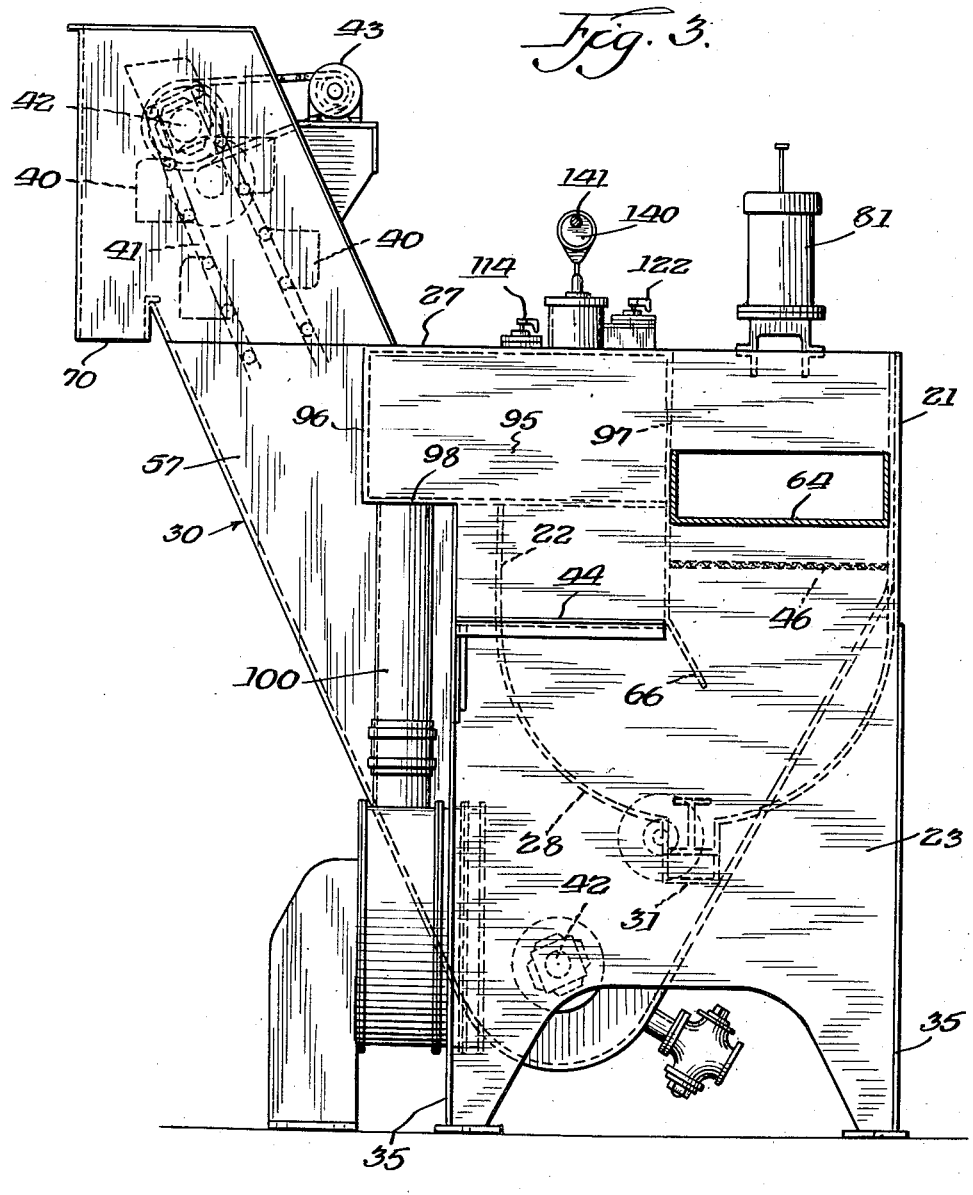

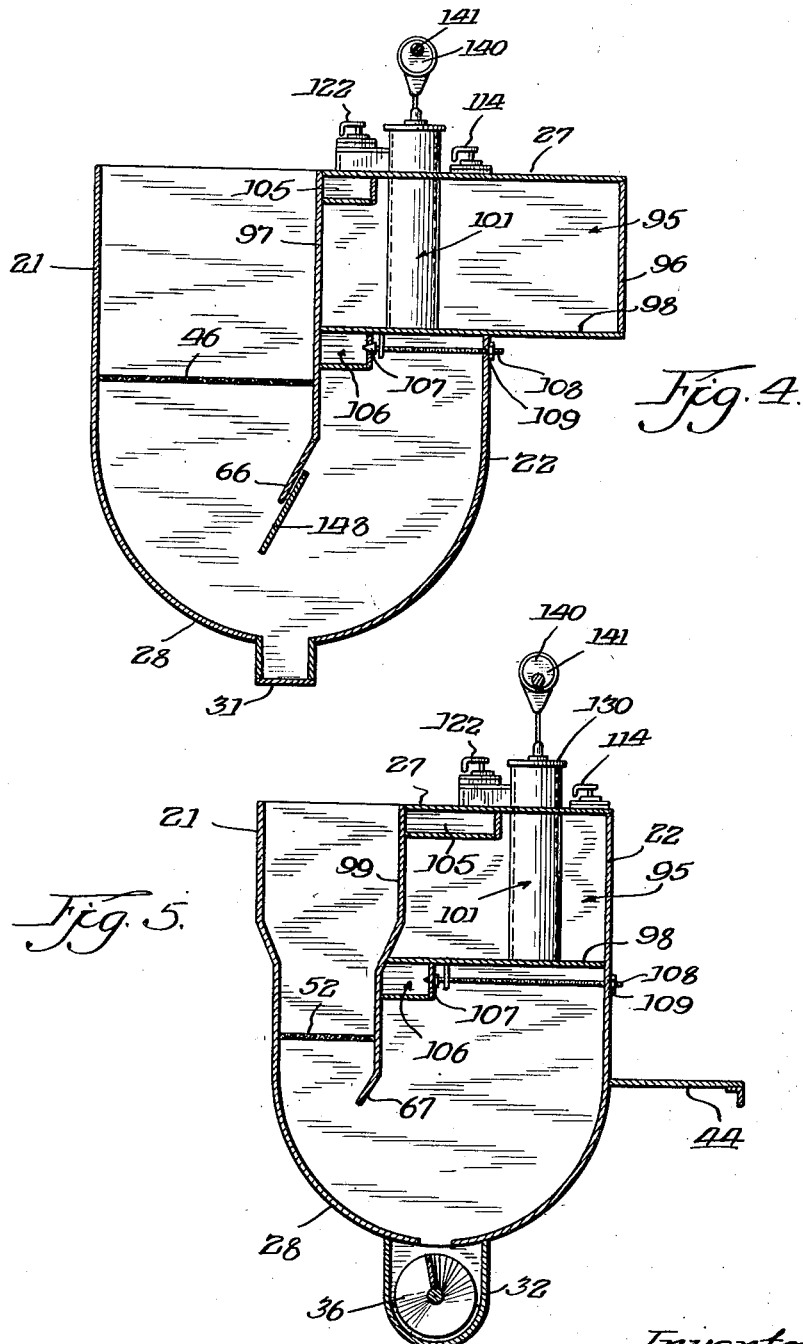

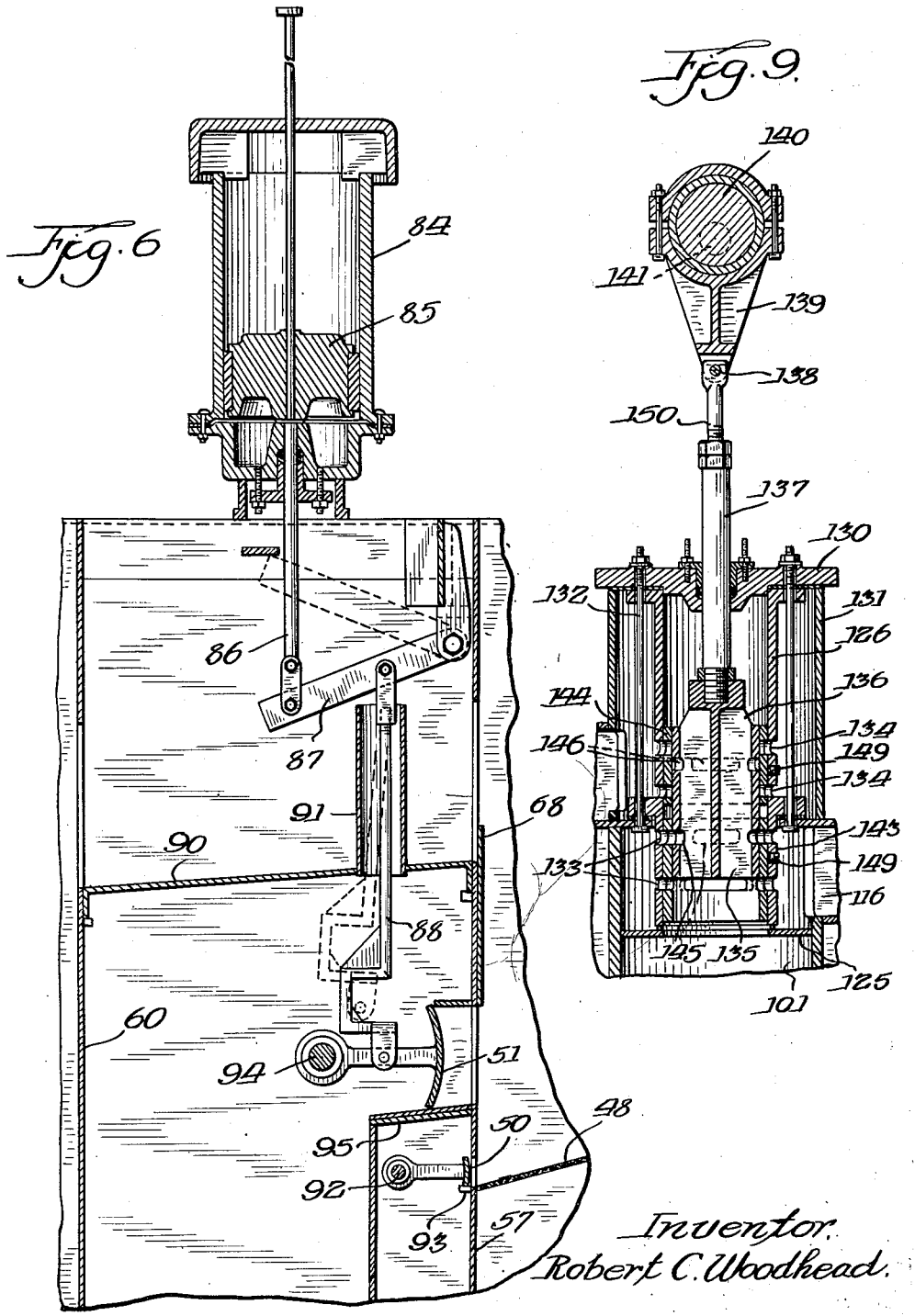

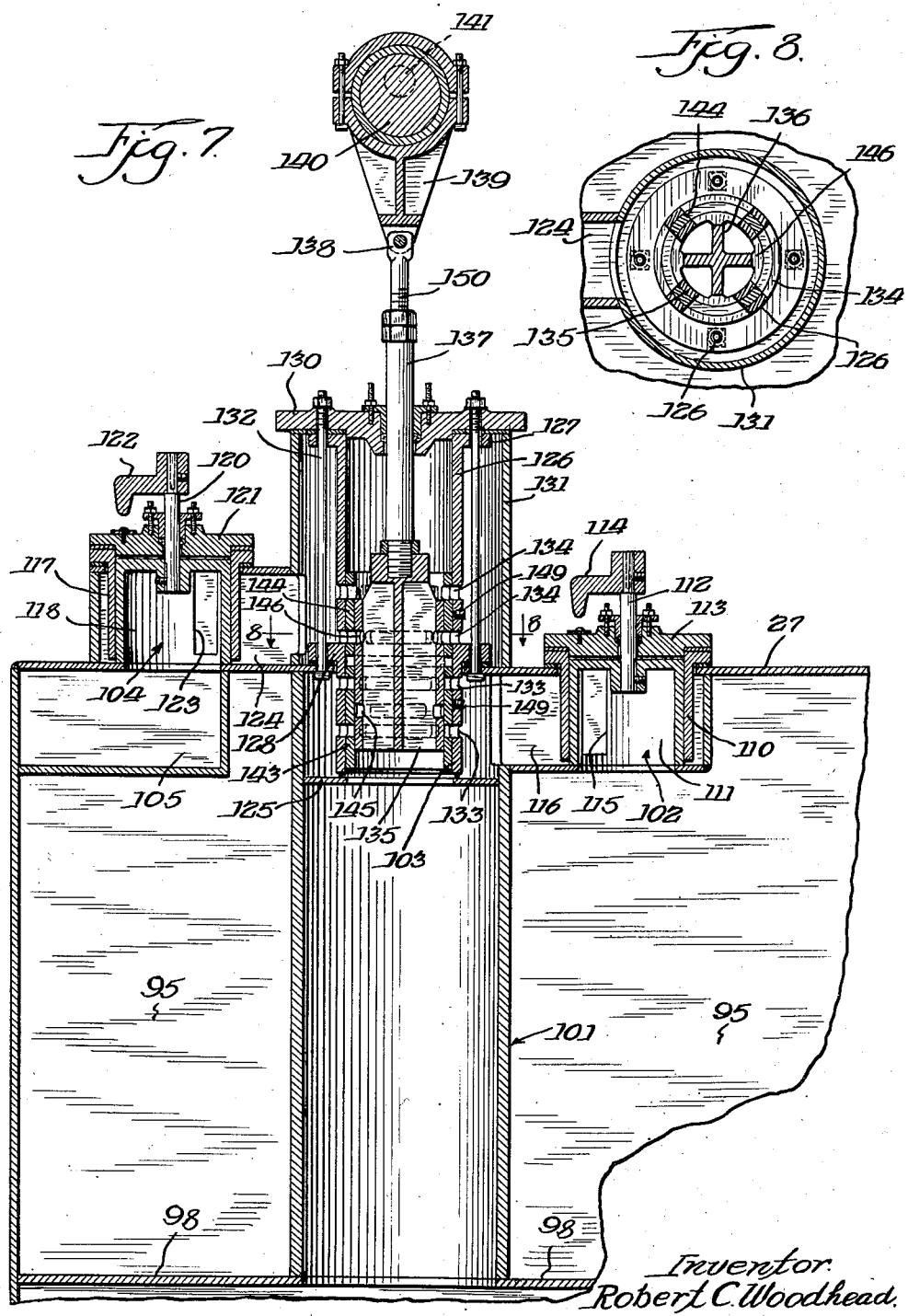

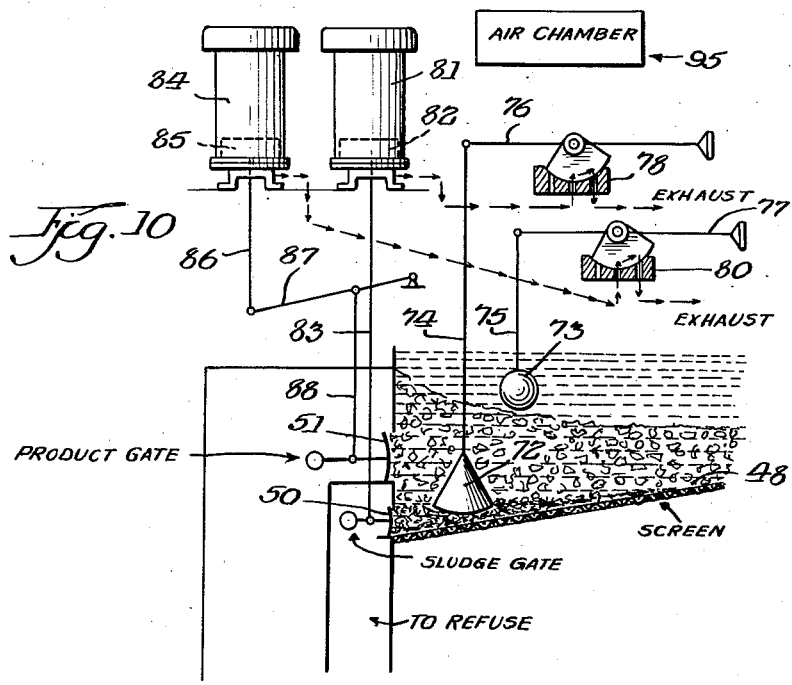
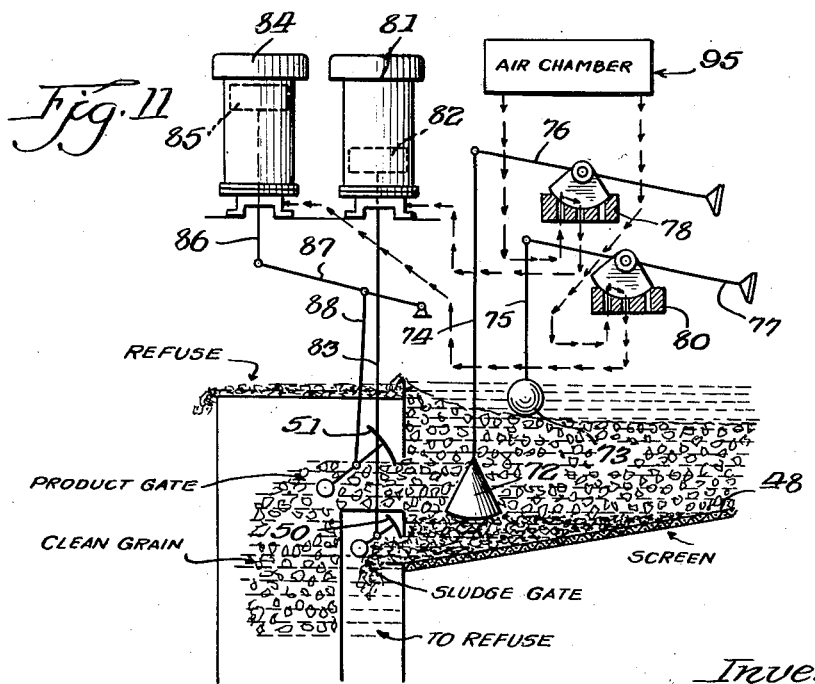

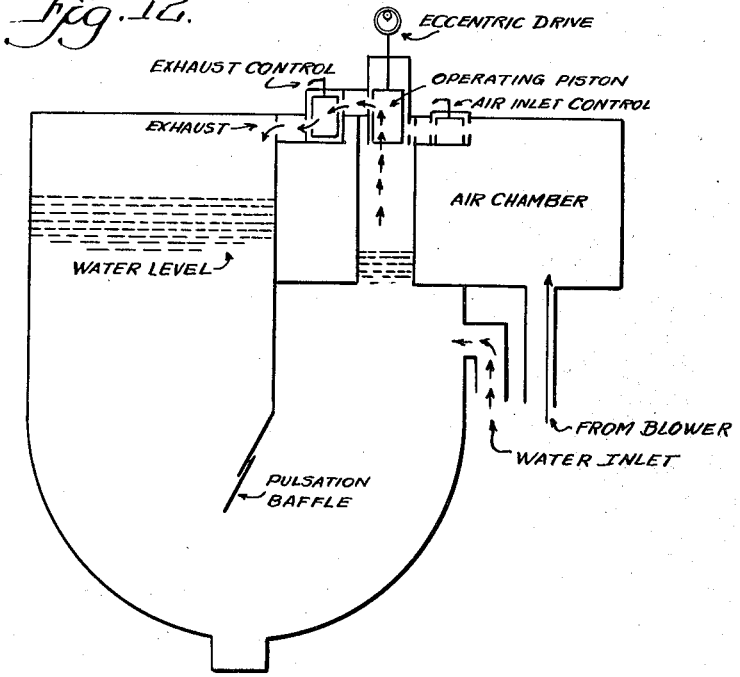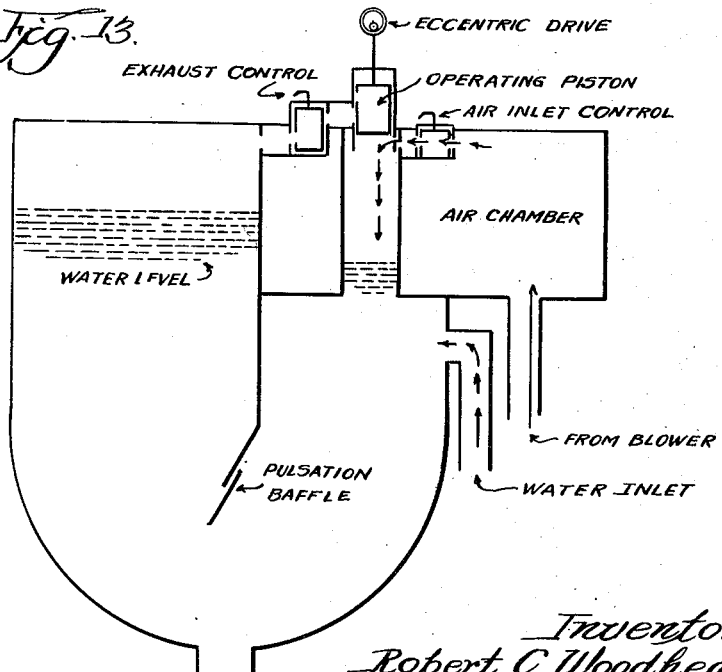

2,819,797
METHOD AND APPARATUS FOR CLEANING CORN AND OTHER CEREAL GRAINS

Robert C. Woodhead, Pittsburg, Kans., assignor to The McNally Pittsburg Manufacturing Corporation, Pittsburg, Kans., a corporation of Kansas Application August 3, 1954, Serial No. 447,501

13 Claims. (Cl. 209—455)

The invention relates to the art of material separation by gravity action in a liquid medium and has reference in particular to a method and apparatus for cleaning corn and other cereal grains by causing a pulsating liquid to flow through a bed of the material and by so doing to separate the refuse materials from the good kernels.

When intermixed, granular materials are delivered into an upward current, all particles having terminal velocities greater than the upward flow rate of the fluid, will naturally continue to sink, while those with terminal velocities less than that of the fluid will be floated to the surface. This constitutes primarily a classification of like-falling particles, that is, particles having the same terminal velocity. If, however, all the particles in the mixture are close to the same size, such up-current classification closely approximates specific gravity separation. Conversely, if the particles are within a relatively narrow densimetric range, the hydraulic current will effect classification at some equivalent size.

During the initial stages of sinking, before sufficient velocity has been attained to bring the fluid resistance into prominence, the falling rates of individual particles are directly proportional to the difference between their specific gravity and that of the fluid. It therefore, instead of continuous sinking in still fluid, or continuous upward flow, the sinking is intermittent, each successive cycle will produce a vertical separation between particles of different densities. For each cycle this separation may be very small dimensionally but it is increased at each repetition. If the particles are subjected to a sufficient number of such cycles, the lighter particles, regardless of size or shape, will be concentrated in the upper strata of the bed of material, with the denser material at the bottom.

Accordingly, an object of the present invention is to provide an improved method for cleaning corn or other cereal grains which will essentially consist in supporting a bed of the grain to be cleaned on the screens or perforated plates and subjecting the said bed to pulsating flows of liquid such as water, and wherein the pulsating flows will be precisely controlled so that the desired impulse wave form for each cycle is secured for alternately distending and settling the material of the bed in the required manner. For each pulsating cycle the material of higher and lower density will be separated vertically and by successive applications of the impulse cycles the entire bed can be stratified on a densimetric basis with the very lightest material at the top, the heaviest at the bottom, and the intermediate density fractions in their proper relative positions.

In the cleaning of corn and other cereal grains by hydraulic means as above described, precise selection and control of the pulsating liquid flows is essential due to the fact that complete separation must be effected between the good kernels and the intermixed impurities such as rat pellets and broken or damaged kernels, notwithstanding their overlapping densities. Therefore another object of the invention is to provide a method of cleaning corn and other cereal grains by hydraulic means which will be highly effective in separating the good kernels of the grain from rat pellets and other refuse material despite their overlapping densities.

In connection with the foregoing, a more specific object of the invention is to provide a method for cleaning corn and other cereal grains by hydraulic means wherein compressed air will be alternately admitted and exhausted from a compartment above the liquid for producing the desired pulsating flows of said liquid, and wherein the air inlet rate, the exhaust rate, the water admission rate, as well as the impulse frequency together with the proportioning of each cycle between pulsation and back flow are infinitely adjustable between the maximum and minimum limits for the particular device. Thus, it is possible to obtain the precision of impulse control required for effectively cleaning cereal grains and which is particularly necessary in the separation of rat pellets from the good kernels.

Another object in connection with the improved method of the invention for separating impurities such as rat pellets and broken or damaged kernels from the corn and other cereal grains resides in the provision of new and novel apparatus incorporating special structural features for efficiently and effectively carrying out the method.

A still further object is to provide apparatus for the purposes described which will incorporate separate and independent means for regulating the impulse frequency, the air and water intake rates, the air exhaust rate, and the proportioning of the impulse cycle between pulsation and back flow, and wherein said apparatus will additionally incorporate mechanism having automatic operation for controlling and regulating the depth of the bed of material permitted to accumulate on the supporting screens during operating periods of the apparatus.

Another object of the invention is to provide washing apparatus of the pulsating type for cleaning corn and the like which will incorporate improved structural features whereby sludge such as rocks, stones and similar heavy particles will be discharged through the lower sludge gate, whereby the clean corn will be discharged through the product gate located immediately above the sludge gate, and whereby the rat pellets and other impurities will be discharged over the out-flow weir at the top of the bed along with the escaping water.

Another object is to provide washing apparatus of the pulsation type for cleaning corn and other cereal grains which will operate on the two-stage principle incorporating a first and a second compartment, wherein the first compartment has both a sludge gate and a product gate with the second compartment having only a product gate, and wherein the overflow from the first compartment is retreated in the second compartment to recover any good grain therefrom.

With these and various other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 1 is a longitudinal sectional view taken along line 1—1 of Figure 2 and showing the washing compartment of apparatus which may be employed for cleaning corn and other cereal grains in accordance with the method of the present invention;

Figure 2 is a top plan view of the grain washing apparatus such as disclosed in Figure 1;

Figure 3 is an elevational view showing the rear or grain receiving end of the washing apparatus of Figure 1;

Figure 4 is a vertical, transverse sectional view taken substantially along line 4—4 of Figure 1;

Figure 5 is a vertical, transverse sectional view taken substantially along line 5—5 of Figure 1;

Figure 6 is a fragmentary sectional view showing details of the sludge gate and the product gate and the mechanism for effecting actuation thereof;

Figure 7 is a fragmentary sectional view illustrating the constructional details of the impulse valve, the inlet valve for the air, and the air exhaust valve, with the impulse valve being shown in elevated exhaust position;

Figure 8 is a fragmentary sectional view of the impulse valve taken substantially along line 8—8 of Figure 7;

Figure 9 is a fragmentary sectional view showing the impulse valve in lowered position with the air inlet ports open;

Figure 10 is a schematic sectional view showing the sludge and product gates in closed position and which also illustrates diagrammatically the pneumatic means which is controlled by the depth of the beds for actuating the said gates;

Figure 11 is a schematic sectional view similar to Figure 10 but showing the sludge gate and the product gate in open position, and illustrating diagrammatically the action of the pneumatic means in opening the gates;

Figure 12 is a sectional view showing diagrammatically the structure of Figure 4 and illustrating the mode of operation of the pulsating apparatus when the exhaust ports are open; and Figure 13 is a sectional view showing diagrammatically the structure of Figure 4 and illustrating the mode of operation of the pulsating apparatus when the air inlet ports are open.

Referring to the drawings, particularly Figures 1, 2 and 3, the numeral 20 indicates apparatus for cleaning grain in accordance with the method of the invention, the said apparatus being rectangular in plan and consisting of side walls 21 and 22, end walls 23, 24 and 25, and a top wall 27. In elevation, Figure 3, the end wall 23 is approximately rectangular in shape, the same having location at the rear, inlet end of the apparatus and depending some distance below the wash box of the same. The end walls 24 and 25 have location at the forward, delivery end of the apparatus and said walls together with 26 effect a closure for this end, the same having a size and shape substantially conforming to that of the wash box. The side walls 21 and 22 join to form the semi-circular bottom 28 of the wash box, said box being interrupted intermediate its length by the elevator section 30 which characterizes washing apparatus of this type. As clearly seen from the drawings, Figures 4 and 5, the semi-circular bottom 28 of the wash box is provided with hutch troughs, hutch trough 31 being located at the entering end of the wash box and having association with the first or primary washing compartment, whereas hutch trough 32 is located at the delivery end and has association with the secondary washing compartment. Supporting structure for the apparatus is provided by the vertical standards 33, 34 and 35. A screw conveyor 36 operates within the hutch trough 32, said conveyor being journalled at 37 and being driven from any suitable source of power having operative connection with sprocket wheel 38. Elevator mechanism in the form of a chain conveyor is located within elevator section 30, the said chain conveyor including buckets 40 fixed to an endless chain 41 is supported at respective ends by the sprocket shafts 42. Suitable driving means for the chain conveyor may include the electric motor 43. The numeral 44 indicates service walk-ways which extend along one side and at respective ends of the wash box to enable an operator to observe the operation of the valves and the floats and to additionally enable servicing of the same and other equipment of the apparatus.

The top wall 27 extends longitudinally of the wash box for half the width thereof, providing a top closure for the pneumatic or pulsating section thereof and which includes the air chamber, the air inlet valve, the air exhaust valve, and a pulsating valve, all of which will be described in detail as the description proceeds. The washing section of the box is open at the top for observation of the hydraulic action taking place with respect to the bed of material supported by the screens or perforated plates with which this section is equipped. The screen located in the primary washing compartment includes a part 46 pivoted at 47 for adjustment as regards the inclination of the screen. The screen is completed by a fixed part 48 preferably having a downward slope leading to the sludge gate 50. The product gate 51 for primary compartment is located above the sludge gate and opens into the elevator section 30, whereas the sludge gate opens into chamber 52 located within but separated from the elevator compartment. Thus stones, rocks, pebbles, etc., which are discharged by the sludge gate are removed from the bottom of chamber 52, whereas, the good grain discharged by the product gate enters the elevator section 30 and is eventually removed therefrom. The secondary washing compartment has a supporting screen 52 pivoted at 53 and which has associated relation with the gate 54 for this section. The grain washing apparatus as disclosed by the drawings is a two-compartment, five-cell type, the three cells 55 of the primary washing compartment being formed by the end wall 23, the transverse partition 56 and side wall 57 of the elevator section 30. In a similar manner the two cells 58 of the secondary washing compartment are formed by side wall 60 of the elevator section, by the transverse partition 61, and by the end wall 62.

The corn or other cereal grain to be treated is discharged into the primary washing compartment from the material receiving chute 64 located at the rear or entrance end of the wash box and having secured relation with wall 23. Refuse materials, including rat pellets together with excess water, is discharged from the apparatus by the chute 65 extending from end wall 24. In the primary washing compartment a centrally located baffle plate 66, Figure 4, functions to separate the pneumatic section from the primary washing compartment, and a similar baffle plate 67 extends centrally and longitudinally of the secondary washing compartment. The air under pressure which is alternately admitted to and exhausted from the pneumatic section produces pulsating flows of water in the wash box and which flows take place transversely within the several cells. As a result the water surges back and forth many times a minute, the frequency of the surges being variable and subject to controlled adjustment by the operator to suit particular conditions. The bed of grain, which may have rat pellets and other refuse material intermixed therewith, and which is supported by screens 46, 48 and 52, is continuously distending and settling in response to the water surges. Primary cleaning is effected by the water surges which takes place in the cells 55, the same stratifying the bed into three layers, with the heavy refuse materials such as stones, rocks, pebbles, etc., settling on the screen 48 to be eventually discharged through the sludge gate 50. The rat pellets and other refuse material of this nature will be forced to the surface of the grain bed and such material will eventually overflow the weir 68 with the discharging liquid. The third layer constitutes the good kernels of grain, the same having an intermediate position in the bed and being eventually discharged through gate 51. Secondary cleaning of the material overflowing the weir 68 takes place in the secondary washing compartment, with the material being supported on screen 52 and the water pulsations taking place in the cells 58. The secondary compartment merely retreats the overflow to recover any good grain which may have been passed with the refuse material from the first compartment. The grain thus recovered in the secondary compartment is discharged through gate 54 and is reunited by means of the screw conveyor 36 with the good grain from the primary compartment, all of which collects in the bottom of elevator section 30. By the operation of the endless chain conveyor the buckets 40 will remove the good grain from the bottom of the elevator section and will discharge the same through discharge outlet 70, Figure 3. The rat pellets and light refuse material from the secondary compartment will overflow the weir 71 along with excess liquid and this constitutes the final discharge of said refuse material from the apparatus.

The need for the secondary washing compartment is due to the fact that the concentration of rat pellets in the raw feed is likely to be too low to form a solid layer or stratum above the grain for the full width of the primary washing compartment. Therefore these rat pellets can not be forced over the out-flow weir 68 without being accompanied by a considerable amount of good grain. The mixture in the over-flow weir 68 contains all the pellets and only a small percentage of the grain. Therefore the concentration of pellets is much heavier and should be sufficient to provide a solid layer of pellets across the reduced width of the secondary compartment.

Both washing compartments of the present wash box are provided with automatic means in the form of floats for operating the gates in accordance with the depth of the bed accumulating on the supporting screens. Considering first of all the primary compartment, it will be seen from Figures 1, 10 and 11, that a float 72 is provided for the sludge gate 50, with a second float 73 being provided for the product gate 51. The floats are suspended by rods 74 and 75 from their particular counterpoise 76 or 77, each counter-poise being adjustable and which in turn actuate an air valve such as 78 and 80. The air valve 78 for the sludge gate 50 controls the admission and exhaust of compressed air with respect to power cylinder 81, the said cylinder having piston 82 operating therein and which is connected to the sludge gate by a connecting rod such as 83. In a similar manner the air valve 80 controls actuation of power cylinder 84 having piston 85 operating therein and which is connected by rod 86, lever 87 and rod 88 to the product gate 51. Since rod 88 extends through flow plate 90, as best shown in Figure 6, an upstanding sleeve 91 is provided which forms a passage for the rod while preventing any leakage of the fluid overflowing the weir 68. The sludge gate is pivotally supported at 92 and in closed position said gate rests on the platform 93. Platform gate 51 is pivoted at 94 and in closed position the gate rests on platform 95. When the bed of heavy material such as stones, rocks and pebbles builds up to a predetermined size the float 72 will be actuated to in turn actuate the power cylinder 81 by admitting compressed air below the piston 82 thereof, see Figure 11. As a result the piston is elevated and the sludge gate is lifted into an open position. Similar action takes place with respect to float 73 which is controlled by the depth of the bed of good grain, the float actuating the air valve 80 and power cylinder 84 to in turn actuate the product gate 51. When the beds have decreased in size, due to the loss of material flowing through the respective gate openings, the floats will descend and the gates will be lowered to reduce the openings and in many instances to completely close the same. Float 72 will normally be submerged in the bed of grain and will be adjustable to a specific gravity between that of the heaviest grain and the lightest of the stones, rocks, pebbles, etc. The float 73 is a light gravity float only slightly above unit specific gravity. Said float will be set at the proper depth below the water overflow line to permit evacuation of the rat pellets and other impurities brought to the top of the bed while permitting the minimum of good grain to overflow with said discharging liquid. Another float similar to 73 is located in the secondary washing compartment, said float being indicated by numeral 73a and by means of an air valve 80a the power cylinder 84a is actuated to control opening and closing movement of the product gate 54 as the float is caused to rise and float by the bed of grain such as will build up in screen 52.

As shown in Figures 4 and 5, the washing chambers are located along the left side of the wash box with the pneumatic or air pulsating section being located along the right side. Said pulsating section essentially consists of an air chamber indicated in its entirety by numeral 95 and which for the length of the primary compartment is formed by side walls 96 and 97 and by top wall 27 and bottom wall 98. For the secondary washing compartment the air chamber is somewhat reduced in width, the same being formed by side walls 22 and 99 and by the top wall 27 and bottom wall 98. The air chamber is purposely located below the top wall 27 of the wash box and as a result of this constructional arrangement the bottom wall 98 of the air chamber forms the top wall of the compartment for the pulsating liquid. Air under pressure is supplied to the air chamber by means of suitable structure such as the supply pipe 100, Figure 3. Said compressed air from the air chamber is admitted to within the standpipe 101 by an air inlet valve such as generally indicated by numeral 102, Figure 7, and by the pulsating valve, the same being likewise generally indicated by numeral 103. Said air pressure is accordingly applied to the surface of the water for the particular cell of the pulsating section to cause a pulsating water flow to take place through the bed of material to thereby distend the same. Following this action of the water flow the compressed air is exhausted by the action of the pulsating valve, the exhaust flow taking place through the exhaust valve generally indicated by numeral 104 and which exhausts into passage 105. It is necessary for purposes of the invention that each cell have its own particular impulse wave form as regards the pulsating flow of liquid taking place within the cell and, accordingly, the top wall 27 is provided with a plurality of said air inlet valves, exhaust valves and pulsating valves, with a set of the same being located with respect to each cell so as to individually control the water pulsations for that particular cell. The passage 105 extends longitudinally of the apparatus and has connection with all the exhaust valves. In a similar manner the water header 106, as best shown in Figures 4 and 5, also extends longitudinally of the apparatus and for each cell a valve such as 107 is provided, the same being controlled by the threaded regulating rod 108 which extends laterally of the pulsating section and terminates beyond wall 22. The valve 107 for each cell is opened for admitting a predetermined quantity of water in order that the desired impulse wave form may be secured for that particular cell and the threaded regulating rod can then be locked in position by the lock nut 109.

Referring again to Figure 7, it will be seen that each of the air inlet valves 102 are located below the top wall 27 so as to have a position within the air chamber 95. However, each of the exhaust valves 104 is located above the top wall 27 and therefore they have a location outside of the air chamber. The air inlet valves are somewhat conventional in design, essentially consisting of a stationary part which may be referred to as the stator 110 and a rotatable part or rotor 111, the same having location within the stator and being suitably secured to shaft 112 extending through and terminating exteriorly of the top wall 113. Said shaft 112 is provided with the indicator knob 114 and which visually indicates to the operator the extent to which opening 115 in the rotor may be aligned with a similar opening in the stator. Since the air inlet valve is located within the air chamber, it will be seen that the interior of the rotor is in communication with the air chamber, and with the valve set for a predetermined inlet opening, it will be seen that the air under pressure from the chamber will be admitted to passage 116 leading to the air pulsating valve 103.

The construction of each of the air exhaust valves 104 is substantially similar to the air inlet valves, the same including a stationary part 117 which may be referred to as a stator and the rotatable part in the form of a rotor 118 disposed within the stator and having communicating relation with the air exhaust passage 105. The rotor is suitably connected to shaft 120 which extends through top wall 121 to terminate above the same with said projecting end having an indicator knob 122 fixed thereto. By rotation of the rotor 118 the exhaust opening 123 therein may be aligned to any desired extent with a similar opening formed in the stator and thus passage 124 from the pulsating valve 103 is connected with the air exhaust header 105.

Figures 7, 8 and 9 disclose the structural details of the pulsating valve 103 which is located in the upper portion of the standpipe 101. The air inlet passage 116 is closed by the partition 125 which provides the top plate within standpipe 101, the bottom thereof being open and in communication with the surface of the water. Admission of air to within the standpipe and the exhausting of said air therefrom is controlled by the pulsating valve which essentially consists of a cylindrical stationary part 126 having a top flange 127 and a bottom flange 128. Said stationary part 126, the top plate 130, and the outer cylindrical housing 131 are bolted in assembled relation to the top wall 27 by the lag screws 132. The stationary part of the pulsating valve is provided with a pair of air inlet openings 133 and a pair of air exhaust openings 134. The piston 135 of the valve is provided with internal ribs 136 disposed in right angle relation and to which the piston rod 137 is secured, said rod extending through the top plate 130 to project beyond the same for connection at 138 with member 139 which has operative association with the eccentric 140. The eccentrics for all the pulsating valves are fixed to and rotated by drive shaft 141 suitably driven from the electric motor 142 by an endless chain or the like. The stationary part 126 has auxiliary sleeves including upper and lower portions 143 and 144 fixed thereto by set screws 149. Air inlet and exhaust openings such as 133 and 134 are formed in the sleeve portions 143 and 144, respectively. The piston sleeve 135 has air inlet openings 145 and air exhaust openings 146. The upper and lower auxiliary sleeves are independently adjustable whereby an additional control is provided as regards the impulse wave form. With eccentric 140 in a down position, as shown in Figure 7, the piston sleeve is so located with respect to stationary part 126 of the valve as to align the exhaust ports for exhausting air from standpipe 101. In Figure 9 the eccentric 140 is shown in an up position and as a result thereof the piston sleeve is located so as to align the air inlet ports for admitting air under pressure to the standpipe.

In the treatment of corn and other cereal grains which have light impurities such as husks, corn cob fragments, and the like intermixed therewith, and which also have heavy impurities, such as stones, rocks and pebbles, as well as rodent pellets, ranging in density above and below that of the good kernels, the basic problem is to effect separation of such refuse material from the good kernels, notwithstanding their overlapping densities. Corn kernels, for example, fall within a relatively narrow specific gravity range and they are consistently heavier than water. Also they are relatively uniform in both size and shape, their shape being so streamlined as to minimize fluid resistance and establish relatively rapid settling rates. On the other hand, the rat pellets vary considerably in size, shape and specific gravity. While a considerable portion of them are less than unit specific gravity and will therefore float even in still water, a certain percentage are of higher gravity than the major portion of the corn. In operation of the present apparatus for cleaning corn and with proper adjustment of the controls for the required impulse wave form, it has been found that the good kernels are not picked up as soon or as rapidly or carried up as far as the rat pellets. At the end of the upward impulse the corn kernels come to rest before the pellets since the kernels have a smaller upward velocity. In turn, because of their distinctive shape, the corn kernels begin to fall more quickly and at a higher velocity than do the pellets. Excessive downward current or backflow would tend to disrupt the separation thus made but the control of the air pulsating mechanism of the present apparatus is such that sufficient water may be introduced during each operating cycle to minimize or even to substantially eliminate backflow. As a result of the above operating procedures the pellets will gradually work to the top of the corn bed even though some of them are of higher specific gravity than the corn kernels comprising the bed. Having reached the top of the bed, those pellets of less than unit specific gravity will naturally overflow with the excess water discharging at each upward impulse. The heavier density pellets can sink back only to the top of the corn bed since the quick settling of the corn closes up the bed before the pellets can sink down to it. Also this quick settling of the corn kernels is facilitated by control of the backflow as regards the water pulsations. A layer of the heavy pellets will gradually accumulate on top of the corn bed and eventually they will be discharged over the weir with the overflowing water.

The above separating action for cleaning a bed of grain such as corn is accomplished efficiently and to a satisfactory degree by the present washer by reason of the flexibility of the various controls which make possible a precise and positive control of the impulse wave form for each of the individual cells. The pulsation baffle 148, provided for each cell, as best shown in Figure 4, has no direct bearing on the control of the impulse wave form but is necessary for establishing uniform distribution of the impulse intensity across the full width of each washing compartment. Also to adapt the individual cells to their required tasks the baffles should be separately adjustable. With the exhaust ports of the pulsating valve closed and the air inlet ports open, it will be understood that air under pressure will be admitted from the air chamber to the standpipe and that the same will act directly on the water level, which normally is slightly up in the standpipe at the start of each impulse cycle. For a better understanding of the foregoing, reference is made to Figure 13. The water inlet is also open at this time but with maximum air pressure in the compartment very little water will actually be flowing into the same. As the compressed air continues to enter and depress the water level in the pulsation section of the wash box an upward surge of water is produced in the washing compartment to cause the grain bed supported by the screen to be distended. At the very start of the impulse cycle when the air inlet ports of the pulsating valve first start to open the high pressure air from the chamber is available to recompress any volume of air above the water level in the standpipe. Following this action and as the air inlet ports open to their full extent the admission of high pressure air is continued and the same is controlled by the setting of the air inlet valve 102. In a similar manner the air exhaust valve 104 can be adjusted at a particular setting in order to obtain the desired control of the exhaust. When the air inlet ports close and the exhaust ports open, see Figure 12, the pressure from above the water is relieved and after overcoming its momentum of flow the same will come to rest and will be ready to flow back through the grain bed to cause settling of the same. Meanwhile against this reduced pressure in the pulsating section fresh water will enter from header 106. The entrance of this water will tend to expedite the air exhaust and at the same time it also resists backflow of water from the washing compartment. Therefore, by adjusting the rate of admission of water with respect to the volume of water pumped into the washing compartment by the compressed air during each cycle the total amount of backflow may be controlled.

Another feature as regards the control provided by the present apparatus concerns the adjustability of the piston rod 137 which can be adjusted in length so as to vary the ratio of the exhaust-intake interval for each cycle. The part 150, Figure 7, is threaded for adjustable connection with the tubular part of the piston rod 137 and accordingly said piston rod can be lengthened or shortened so as to change the location of the inlet and outlet openings in the piston sleeve relative to their companion openings in the stationary part of the valve. Also, by raising or lowering the auxiliary sleeves 143 and 144, as regards their position on the stationary part 126, further control over the impulse wave form is secured since the size of the opening for the intake and exhaust ports as the piston sleeve reciprocates can be adjusted independently of the exhaust-intake adjustment of the piston rod. For a neutral position one-half of each cycle is devoted to intake and the other half to exhaust. By adjusting the length of the piston rod it is possible to adjust the exhaust-intake ratio from twenty percent to eighty percent of the cycle. For example, eighty percent of the cycle may be devoted to intake with twenty percent to exhaust, or eighty percent of the cycle may be exhaust and only twenty percent intake.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a method of cleaning corn and other cereal grains having impurities intermixed therewith including light and heavy impurities and rat pellets ranging in densities from above to below those of the good kernels of the grain, the steps which consist in supporting a bed of the grain to be treated immediately above a bath of water, subjecting the water bath to pulsating air pressures to produce pulsating flows of the water to cause the water to flow up through the bed and then down through the bed for alternately distending and settling the same, controlling the characteristics of the pulsating flows of water as regards intensity, frequency and backflow by controlling the pulsating air pressures through regulation of the air inlet rate, air exhaust rate and the exhaust-intake ratio for each cycle, whereby to cause the bed to stratify horizontally in layers with a top layer consisting of light impurities and the rat pellets, a bottom layer consisting of the heavy impurities and an intermediate layer comprising the good kernels of the grain, and in discharging the top layer in a first path, the bottom layer in a second path, and the intermediate layer in a third path.

2. In a method of cleaning corn and other cereal grains having impurities intermixed therewith including light and heavy impurities and rat pellets ranging in densities from above to below those of the good kernels of the grain, the steps which consist in supporting a bed of the grain to be treated immediately above a bath of water, subjecting the water bath at a location removed from the bed to pulsating air pressures to produce back and forth surges of the water adjacent the bed whereby the water is caused to flow up through the bed and then down through the bed for alternately distending and settling the same, controlling the pulsating air pressures by selecting a particular air inlet rate, air exhaust rate and air exhaust-intake ratio and by regulating the air pressure and water inlet rate, whereby to secure the proper impulse wave form as regards the back and forth water surges for the particular grain being treated to cause the said bed thereof to stratify into layers horizontally disposed, with a top layer containing the light impurities and the rat pellets, a bottom layer containing the heavy impurities and an intermediate layer of the good kernels of the grain, and in discharging the intermediate layer in a path separate and independent from the discharge paths for the impurities.

3. In a method of cleaning corn and other cereal grains having refuse material intermixed therewith including light refuse materials, heavy refuse materials and rat pellets ranging in densities from above to below those of the good kernels of the grains, the steps which consist in continuously feeding the grain to be treated onto a screen to form a bed thereof in supported relation on the screen, subjecting said bed to treatment by a jigging liquid, producing the pulsating flows of said liquid by subjecting the liquid to pulsating air pressures, whereby the liquid is caused to periodically flow up through the bed to distend the same, controlling the pulsating air pressures by controlling the air inlet rate, the air exhaust rate, and the exhaust-inlet ratio for each cycle to thereby produce an impulse wave form as regards the pulsating liquid flows which will stratify the bed into a plurality of layers with the light refuse materials and the rat pellets on top, with the heavy refuse materials on the bottom and with the good kernels of the grain therebetween, continuously gauging the depth of the layer of good kernels, discharging the said good kernels through one path at intervals controlled by the gauged depth of the layer, discharging the layer of heavy refuse materials through a second path, and removing the layer of light refuse materials and rat pellets from the bed by causing the same to overflow with the excess liquid on the upflow portion of each pulsating cycle.

4. In apparatus of the character described, the combination with a wash box, of a screen extending longitudinally thereof for supporting material to be treated, means for periodically pulsating a liquid within the wash box to cause surging flows of said liquid transversely of the wash box, whereby the liquid will periodically pass through the screen to stratify the material thereon, a sludge gate at the discharge end of the screen, a product gate also at the discharge end of the screen and located above the sludge gate, a weir likewise having a position at the discharge end of the screen and located above the product gate, and means for effecting actuation of the gates independent of each other including a float suspended above the discharge end of the screen, and a second float also suspended above the discharge end of the screen but located above the first mentioned float.

5. In apparatus for cleaning corn and other cereal grains having refuse materials intermixed therewith including light refuse material, heavy refuse material and rat pellets ranging in densities above and below those of the good kernels of the grain, the combination with a wash box of a screen extending longitudinally thereof and having an entrance end and a discharge end, said screen supporting the grain to be treated to form a bed of said grain on the screen, means for pulsating a bath of water within the wash box to cause surging flows of said water transversely of the wash box, whereby the water will periodically flow up through the bed to stratify the same into layers formed of refuse material at the top and at the bottom with the good kernels of grain therebetween, a sludge gate at the discharge end of the screen, a product gate also at the discharge end of the screen and located above the sludge gate, a weir likewise having a position at the discharge end of the screen and located above the product gate, means for effecting actuation of the sludge gate including a float suspended above the discharge end of the screen and which is normally submerged in the bed of grain, and other means for effecting actuation of the product gate including a second float also having a suspended position above the screen at the discharge end thereof but which is located above the first mentioned float so as to gauge the height of the grain bed.

6. Apparatus of the character as defined by claim 5, wherein the float for the sludge gate is adjusted to a specific gravity between that of the heaviest of the good kernels of the grain and of the lightest of the heavy refuse materials, and wherein the second float for the product gate is adjusted to slightly above unit specific gravity.

7. In apparatus for cleaning corn and other cereal grains having refuse materials intermixed therewith including light refuse materials, heavy refuse materials and rat pellets ranging in densities above and below those of the good kernels of the grain, the combination with a wash box, of a screen extending longitudinally thereof for half the width of the box to form a washing compartment, an air chamber extending longitudinally of the wash box for the remaining width to provide a pulsating section, said screen supporting within the box a bed of the grain to be treated, means for pulsating a bath of water within the wash box to cause surging flows of said water transversely of the wash box, whereby the water will periodically flow up through the bed to stratify the same, said means including a pulsating valve in associated relation with the pulsating section of the box, an adjustable air inlet valve within the air chamber and having communication with the pulsating valve, an adjustable air exhaust valve located above the air chamber and also having communication with the pulsating valve, and means for actuating the pulsating valve to alternately admit air under pressure from the air chamber to the pulsating section above the water level therein and to exhaust said air therefrom, a water header having a regulating valve for admitting water to the pulsating section, a sludge gate at the discharge end of the washing compartment directly above the level of the screen, a product gate also at the discharge end and located above the sludge gate, and a weir also at the discharge end and located above the product gate.

8. Apparatus for cleaning corn and other cereal grains as defined by claim 7, additionally including means for adjusting the actuating stroke of the pulsating valve to thereby vary the ratio of the exhaust interval with respect to the inlet interval for each cycle.

9. Apparatus for cleaning corn and other cereal grains as defined by claim 7, additionally including mechanism respectively for actuating the sludge gate and the product gate, the mechanism for the sludge gate including a member positioned for gauging the height of the bed of heavy refuse materials adjacent the sludge gate and which controls actuation of its mechanism to cause opening and closing of the sludge gate in accordance with the gauged height of said bed, and the mechanism for the product gate including a member positioned for gauging the height of the grain bed adjacent the product gate and which controls its mechanism to cause opening and closing of the product gate in accordance with the gauged height of said grain bed.

10. In apparatus for cleaning corn and other cereal grains having rat pellets intermixed therewith in addition to light and heavy refuse material, the combination with a wash box including a primary section and a secondary section with an elevator section located between, said primary and secondary sections each consisting of a washing compartment having a longitudinal screen and a pulsating compartment having a longitudinal air chamber, means for feeding to the screen of the primary washing compartment the raw grain to be treated and which thereby builds up on said screen to form a bed, means for pulsating a bath of water within the washing compartment to cause surging flows of said water transversely of the box, whereby the water will periodically flow up through the bed to stratify the same into a top layer containing the rat pellets and the light refuse materials, a bottom layer containing the heavy refuse materials and an intermediate layer consisting of the good kernels of the grain, a sludge gate and a product gate located at the discharge end of the washing compartment for respectively discharging into the elevator section but in different paths, the layer of refuse material and the layer of good kernels, a weir also at said discharge end of the washing compartment with respect to which the rat pellets, the light refuse materials and some of the good grain will overflow with the excess water on the upflow portion of each pulsating cycle, means for delivering said overflows from the primary washing compartment to the secondary washing compartment to thereby form a bed of the same on the screen in the secondary compartment, means for retreating the said bed of material by pulsating a bath of water within the secondary washing compartment, a product gate at the discharge end of the secondary washing compartment for discharging the layer of good kernels, and a weir also at said discharge end of the secondary washing compartment with respect to which the rat pellets and light refuse materials are caused to overflow for final discharge.

11. Apparatus for cleaning corn and other cereal grains as defined by claim 10, wherein the means for pulsating the water baths in the primary and secondary washing compartments includes pulsating valves in associated relation with their respective pulsating compartments, an adjustable air inlet valve for each pulsating valve and located within the air chamber, an adjustable air exhaust valve for each pulsating valve and located above the air chamber, and means for actuating each pulsating valve.

12. In apparatus for cleaning corn and other cereal grains having refuse material intermixed therewith including rodent pellets ranging in densities above and below those of the good kernels of the grain, the combination with a wash-box, of a screen extending longitudinally thereof for half the width of the box to form a washing compartment, an air chamber extending longitudinally of the wash-box for the remaining width to provide a pulsating section, said screen supporting within the box a bed of the grain to be treated, means for pulsating a bath of water within the wash-box to cause surging flows of said water transversely of the wash-box, whereby the water will periodically flow up through the bed to stratify the same, said means including a pulsating valve in associated relation with the pulsating section of the box, an adjustable air-inlet valve within the air chamber and having communication with the pulsating valve, an adjustable air-exhaust valve located above the air chamber and also having communication with the pulsating valve, and means actuating the pulsating valve to alternately admit air under pressure from the air chamber to the pulsating section above the water level therein and to exhaust said air therefrom, a water header having a regulating valve for admitting water to the pulsating section, a product gate at the discharge end of the washing compartment above the level of the screen, a weir also at the discharge end and located above the product gate, the said pulsating valve including a cylindrical stationary part having openings leading to the air-inlet valve and other openings in spaced relation leading to the air-exhaust valve, a piston sleeve reciprocable within the stationary part and having inlet and exhaust openings for alignment periodically with similar openings in the stationary part as the piston sleeve reciprocates, and upper and lower auxiliary sleeves fixed to said stationary part in adjusted position with respect to the openings therein, whereby the extent to which the openings in the piston sleeve align with respective openings in the stationary part upon reciprocation of the piston sleeve can be adjusted without changing the exhaust-intake ratio of the cycle.

13. In apparatus for cleaning corn and other cereal grains having refuse material intermixed therewith, the combination with a wash box including a primary section consisting of a washing compartment having a longitudinal screen and a pulsating compartment having a longitudinal air chamber, means for feeding to the screen of said washing compartment the raw grain to be treated and which thereby builds up on said screen to form a bed, means associated with the air chamber for pulsating a bath of water within the washing compartment to cause surging flows of said water transversely of the box, whereby the water will periodically flow up through the bed to stratify the same into a first layer containing the refuse material and into a second layer consisting of the good kernels of the grain, a product gate located at the discharge end of the washing compartment for effecting discharge of the second layer, and a weir also at said discharge end of the washing compartment above the product gate, the weir having a height with respect to the surging flows of water such that the excess water on each upflow portion of the cycle will overflow the weir, whereby the first layer of refuse material is discharged by the same overflowing the weir with said excess water.

References Cited in the file of this patent

UNITED STATES PATENTS

| | | |
|---|---|---|
| 2,132,378 | Bird | Oct. 11, 1938 |
| 2,273,296 | Stump | Feb. 17, 1942 |